United States Patent [19]
Gellekink et al.

[11] Patent Number: 4,975,705
[45] Date of Patent: Dec. 4, 1990

[54] TARGET DETECTOR

[75] Inventors: Bernard Gellekink, Ootmarsum; Cornelis M. Jansen, Oldenzaal, both of Netherlands

[73] Assignee: Hollandse Signaalapparaten B.V., Hengleo, Netherlands

[21] Appl. No.: 378,951

[22] Filed: Jul. 12, 1989

[30] Foreign Application Priority Data

Jul. 12, 1988 [NL] Netherlands .................... 8801757

[51] Int. Cl.$^5$ .................... G01S 7/295; G01S 13/66
[52] U.S. Cl. .................... 342/52; 342/53; 342/54; 342/67; 342/95; 342/77; 342/195
[58] Field of Search .................... 342/52, 54, 77, 95, 342/131, 140, 200, 201

[56] References Cited

U.S. PATENT DOCUMENTS

| | | | |
|---|---|---|---|
| 3,266,035 | 8/1966 | Farner | 342/77 |
| 3,603,995 | 9/1971 | Howard | 342/95 X |
| 3,787,853 | 1/1974 | Brookner | 342/112 X |
| 3,827,049 | 7/1974 | van Staaden et al. | 342/95 X |
| 3,921,169 | 11/1975 | Lazarchik et al. | 342/52 X |
| 4,486,756 | 12/1984 | Peregrim et al. | 342/62 X |
| 4,743,907 | 5/1988 | Gellekink | 342/95 X |
| 4,760,397 | 7/1988 | Piccolruaz | 342/75 |
| 4,780,719 | 10/1988 | Frei et al. | 342/53 |

FOREIGN PATENT DOCUMENTS 207521 7/1987 European Pat. Off. .
3644002 6/1988 Fed. Rep. of Germany .

*Primary Examiner*—Gilberto Barron, Jr.
*Attorney, Agent, or Firm*—Robert J. Kraus

[57] ABSTRACT

A target detector (1) for detecting targets provided with transmitter means (3, 5) for simultaneous generation of different electromagnetic waves having different frequencies which are transmitted by means of an emission and detection device (2). The target detector is also provided with receiving means (3, 4, 5) for obtaining, by means of the emission and detection device (2), target signals comprising target information received at different frequencies. A signal processing unit (15, 16, 17) is provided for processing the target signals in combination to obtain target-representing signals.

31 Claims, 6 Drawing Sheets

|  | $\Delta B_2^*$ $\Delta E_4^*$ $\Delta R_3^*$ | $\Delta B_1^*$ $\Delta E_1^*$ $\Delta R_1^*$ |
|---|---|---|
| $QB_{1,1}$ | 1 | 0 |
| $QB_{1,2}$ | - | - |
| $QB_{1,3}$ | - | - |
| $QE_{1,1}$ | - | 0 |
| $QE_{1,2}$ | - | - |
| $QE_{1,3}$ | - | - |
| $QR_{1,1}$ | - | 0 |
| $QR_{1,2}$ | - | - |
| $QR_{1,3}$ | - | - |
| $QR_{1,6}$ | - | - |
| $QB_{2,1}$ | 0 | 1 |
| $QB_{2,2}$ | 1 | - |
| $QB_{2,3}$ | 1 | - |
| $QE_{2,1}$ | 0 | 1 |
| $QE_{2,2}$ | 1 | - |
| $QE_{2,3}$ | 0 | - |
| $QR_{2,1}$ | 0 | 1 |
| $QR_{2,2}$ | 1 | - |
| $QR_{2,3}$ | 1 | - |
| $QR_{2,6}$ | - | - |
| $QR_{3,1}$ | 0 | 1 |
| $QR_{3,2}$ | 1 | - |
| $QR_{3,3}$ | 1 | - |
| $QR_{3,6}$ | 1 | - |
| $QB_{4,1}$ | 0 | 1 |
| $QB_{4,2}$ | 0 | - |
| $QB_{4,3}$ | 0 | - |
| $QE_{4,1}$ | 0 | 1 |
| $QE_{4,2}$ | 1 | - |
| $QE_{4,3}$ | 1 | - |

Fig. 4

TARGET DETECTOR

BACKGROUND OF THE INVENTION

The invention relates to a target detector for detecting targets, provided with transmitter means for simultaneous generation of different electromagnetic waves having different frequencies which are transmitted by means of an emission and detection device, with receiving means for obtaining, by means of the emission and detection device, target signals comprising target information received at different frequencies, and with a signal processing unit for processing the target signals generated by the receiving means to obtain target-representing signals.

Such a target detector is known from DE-B No. 1.223.903. The target detector concerned here is a radar suitable for tracking targets. The different frequencies therefore concern microwaves, while the number of different frequencies is two. The patent specification describes that the application of two radar frequencies lying close together has the advantage of providing two observations which can be compared with each other. Signal processing in this patent specification comprises the comparison of the two received echo signals to determine which signal has the lowest amplitude. Subsequently, the signal having the lowest amplitude is used to obtain target-representing signals. The underlying principle is that the signal having the highest amplitude should comprise a noise signal because a target echo should be present in both signals. The system according to this German patent specification has the disadvantage, that as a result of the system setup, it is limited to the use of two observations (the transmitter pulses with a first and a second frequency). Moreover, the system does not allow room for any individual and absolute assessment of the received signals. As a result of the comparison between both signals, the assessment is relative and subjective. Also the frequencies must be close together, because comparison of the amplitude of the reflected waves resulting from the first and the second transmitter frequency would be pointless. After all, if the frequencies should lie far apart, after reflection from a target different amplitudes appear which are not the result of active jamming by a third party. The amplitude of a reflected wave is dependent on the radar cross-section of a target and the antenna gain, which in turn are a function of the frequency with which the target is illuminated. Because no individual assessment of the reflected signals takes place, the signals, the frequencies of which are very far apart, cannot be compared. This implies that the so-called multipath effect cannot be suppressed because, to allow this, the condition applies that both frequencies should lie relatively far apart (e.g. a factor 4).

SUMMARY OF THE INVENTION

The present invention does not have this limitation and is characterised in that the signal processing unit is suitable for processing the target signals in combination to obtain the target-representing signals.

On the basis of the principle of the invention, many potential advantages exist. Thus it is possible to process in combination more than two target signals, because no comparison or selection means are present to select the best target signal. In principle, a target detector can be realised with any number of target signals. Moreover, target signals of a completely different nature can be processed, such as radar echoes, laser echoes and passive infrared radiation, because the target signals according to the invention can be individually assessed In the case of the system according to the German patent specification, the target signals must be of the same type and comprise practically the same frequency.

According to the present invention, the assessment (quality) of a signal may comprise a weighted average of quality aspects such as clutter (rain, birds), jamming, interference and multipath-effects, which are investigated for each target signal. Such an assessment may take place in a well known manner.

According to an embodiment of the invention, the signal processing unit is suitable for generating quality factors relating to the target signals, where the quality factors determine in which combination and to which degree the target signals are processed to obtain the target-representing signals. On the basis of application of quality factors for the purpose of the different target signals, a selection between the different target signals is not necessary, but the target signals may be processed in combination to obtain target-representing signals.

According to a versatile embodiment of the target detector, the transmitter means are suitable for generating m different pulse sequences i having frequency $f_i$ ($i=1,2,\ldots,m$), where the receiving means, by means of target signals detected by the emission and detection device, generate error signals $\Delta B_i$ ($i=1,2,\ldots,n$) indicating the difference in azimuth value of the target with respect to the emission and detection device, error signals $\Delta E_i$ ($i=1,2,\ldots,n$) indicating the difference in elevation value of the target with respect to the emission and detection device and error signals $\Delta R_i$ ($i=1,2,\ldots,n$) indicating the range value of the target with respect to the emission and detection device, where $m \leq n$ and where $\Delta B_i$, $\Delta E_i$ and $\Delta R_i$ with $i=1,2,\ldots,m$, have been determined by means of the transmitted pulse sequence i ($i=1,2,\ldots,m$), and where $\Delta B_i$, $\Delta E_i$ and $\Delta R_i$ (with $i=m+1,\ldots,n$) have been obtained by means of the passive sensors present in the emission and detection device.

In addition, it is possible to combine m active target signals (radar and laser) originating from m transmitted pulse sequences i with frequency $f_i$ ($i=1,2,\ldots,n$) with ($n-m+1$) passive target signals (infrared or video) to obtain the target-representing signals. The signal processing unit preferably generates quality factors $QB_{i,v}$ indicating respectively the quality of signals $\Delta B_i$ with respect to $w_B$ different quality aspects ($v=1,2,\ldots,w_B$). quality factors $QE_{i,v'}$ which respectively indicate the quality of signals $\Delta E_i$ with respect to $w_E$ different quality aspects ($v'=1,2,\ldots,w_E$) and quality factors $QR_{i,v''}$ which respectively indicate the quality of signals $\Delta R_i$ with respect to $w_R$ different quality aspects ($v''=1,2,\ldots,w_R$) and where the signal processing unit processes signals $\Delta B_i$, $\Delta E_i$ and $\Delta R_i$ dependent on the quality factors to obtain the target representing signals and where $i=1,2,\ldots,n$.

The above has the advantage that different components of a target signal ($\Delta R_i$, $\Delta B_i$, $\Delta E_i$) can be assessed for different quality aspects. Hence, quality factors $QB_{i,v}$ ($v=1,2,\ldots,w_R$) relating to the quality of signal $\Delta B_i$ may respectively relate to the signal-to-noise ratio of $\Delta B_i$, and to the clutter level present in this signal. These quality aspects may be derived from signal $\Delta B_i$ itself. However, it is also possible that a quality factor $QB_{i,v}$ is derived from another signal ("cross-correlation"), such as for instance $\Delta E_i$. If, on the basis of signal $\Delta E_i$, it should appear that a jammer is present on frequency $f_i$, it will after all most probably be present in signal $\Delta B_i$ as well. This may be expressed in a quality factor derived from signal $\Delta E_i$, relating to signal $\Delta B_i$. Such a quality aspect can of course also be expressed in a quality factor derived from the signal $\Delta B_i$ itself. If one of the quality factors however expresses the presence of a jammer on frequency $f_i$, it may be considered, for example, not to use signal $\Delta B_i$ at all or to use it to a lesser degree for the derivation of target-representing signals. If frequency $f_i$ is a frequency in the I band, while signal $\Delta R_j$, the frequency $f_j$ of which is in the Ku band, indicates that a target is relatively close by, a quality factor $QR_{i,v''}$ can be derived from signal $\Delta R_j$, which quality factor ensures that signal $\Delta R_i$ will not or to a lesser degree be used for the generation of target-representing signals. Thus the so-called multipath effect can be suppressed. Quality factors can therefore be derived from the signal itself, from another signal obtained at the same frequency and from a signal obtained at a different frequency (with a different sensor).

Owing to the method of generating quality factors $QR_{i,v'}$ $QE_{i,v'}$ and $QB_{i,v''}$, it is also possible to process in a simple way target signals from radar, laser or infrared and video. The quality factors of target signals originating from radar will usually have a value other than zero. However, laser is known to usually only supply range information. It is simple to implement this in the signal processing by selecting the relevant quality factors $QB_{i,v} = QE_{i,v'} = 0$. Along the same line of reasoning, it is possible to select $QR_{i,v''} = 0$ if target signals originate from a passive infrared system.

The target detector is devised in such a way that the signals $\Delta B_i$ are processed dependent on the said quality factors to obtain a first component $\Delta B$ from the target-representing signal, signals $\Delta E_i$ dependent on the said quality factors to obtain a second component $\Delta E$ of the target-representing signal, signals $\Delta R_i$ dependent on the said quality factors to obtain a third component $\Delta R$ of the target-representing signal, and where $i = 1, 2, \ldots, n$.

According to a special embodiment, the signal processing unit is suitable for determining average quality factors $\overline{QB}_i$, $\overline{QE}_i$, $\overline{QR}_i$ in accordance with:

$$\overline{QB}_i = \frac{\sum_{v=1}^{w_B} QB_{i,v} \cdot gBB_{i,v} + \sum_{v'=1}^{w_E} QE_{i,v'} \cdot gBE_{i,v'} + \sum_{v''=1}^{w_R} QE_{i,v''} \cdot gBR_{i,v''}}{\sum_{v=1}^{w_B} gBB_{i,v} + \sum_{v'=1}^{w_E} gBE_{i,v'} + \sum_{v''=1}^{w_R} gBR_{i,v''}}$$

$$\overline{QE}_i = \frac{\sum_{v'=1}^{w_E} QE_{i,v'} \cdot gEE_{i,v'} + \sum_{v=1}^{w_B} QB_{i,v} \cdot gEB_{i,v} + \sum_{v''=1}^{w_R} QR_{i,v''} \cdot gER_{i,v''}}{\sum_{v'=1}^{w_E} gEE_{i,v'} + \sum_{v=1}^{w_B} gEB_{i,v} + \sum_{v''=1}^{w_R} gER_{i,v''}}$$

$$\overline{QR}_i = \frac{\sum_{v''=1}^{w_R} QR_{i,v''} \cdot gRR_{i,v''} + \sum_{v=1}^{w_B} QB_{i,v} \cdot gRB_{i,v} + \sum_{v'=1}^{w_E} QE_{i,v'} \cdot gRE_{i,v'}}{\sum_{v''=1}^{w_R} gRR_{i,v''} + \sum_{v=1}^{w_B} gRB_{i,v} + \sum_{v'=1}^{w_E} gRE_{i,v'}}$$

where $gBB_{i,v}$, $gEE_{i,v'}$, $gRR_{i,v''}$, $gBE_{e,v'}$, $gBR_{i,v''}$ $gEB_{i,v}$, $gER_{i,v''}$, $gRB_{i,v}$ and $gRE_{i,v''}$, are weighting factors determining to which degree the quality factors contribute in obtaining average quality factors.

The weighting determine to which degree a quality aspect of an error signal contributes to the ultimate total assessment of the quality of the error signal. The signal processing unit is suitable for determination of $\Delta B$, $\Delta E$, $\Delta R$ in accordance with:

$$\Delta B = \sum_{i=1}^{n} \Delta B_i \, \overline{Q}_{Bi} / \sum_{i=1}^{n} \overline{Q}_{Bi},$$

$$\Delta E = \sum_{i=1}^{n} \Delta E_i \, \overline{Q}_{Ei} / \sum_{i=1}^{n} \overline{Q}_{Ei},$$

and $$\Delta R = \sum_{i=1}^{n} \Delta R_i \, \overline{Q}_{Ri} / \sum_{i=1}^{n} \overline{Q}_{Ri}.$$

The different error signals $\Delta B$, $\Delta E_i$, $\Delta R_i$ are thus averaged directly and instantaneously to obtain target-representing signals $\Delta B$, $\Delta E$ and $\Delta R$.

A special embodiment of a target detector according to the invention, comprising all the said advantages, is characterised in that the receiving means are provided with an A/D conversion unit for sampling with frequency $f_s$ and digitising of signals $\Delta B_i$, $\Delta E_i$ and $\Delta R_i$ to obtain digital signals $\Delta B_i^*$, $\Delta E_i^*$ and $\Delta R_i^*$.

In the said embodiment it is also advantageous if the receiving means are provided with an A/D conversion unit for sampling with frequency $f_s$ and digitising of signals $QB_{i,v}$, $QE_{i,v'}$, $QR_{i,v''}$ to obtain digital signals $QB_{i,v}$, $QE_{i,v'}^*$, $QR_{i,v''}^*$.

It is possible that the signal processing unit is suitable for determining average quality factors $\overline{QB}_i^*$, $\overline{QE}_i^*$, $\overline{QR}_i^*$ in accordance with:

$$\overline{QB}_i^* = \frac{\sum_{v=1}^{w_B} QB_{i,v}^* \cdot gBB_{i,v}^* + \sum_{v'=1}^{w_E} QE_{i,v'}^* \cdot gBE_{i,v'}^* + \sum_{v''=1}^{w_R} QE_{i,v''}^* \cdot gBR_{i,v''}^*}{\sum_{v=1}^{w_B} gBB_{i,v}^* + \sum_{v'=1}^{w_E} gBE_{i,v'}^* + \sum_{v''=1}^{w_R} gBR_{i,v''}^*}$$

$$\overline{Q}_{Ei}{}^* = \frac{\sum\limits_{v'=1}^{w_E} QE_{i,v'}{}^* \cdot gEE_{i,v'}{}^* + \sum\limits_{v=1}^{w_B} QB_{i,v}{}^* \cdot gEB_{i,v}{}^* + \sum\limits_{v''=1}^{w_R} QR_{i,v''}{}^* \cdot gER_{i,v''}{}^*}{\sum\limits_{v'=1}^{w_E} gEE_{i,v'}{}^* + \sum\limits_{v=1}^{w_B} gEB_{i,v}{}^* + \sum\limits_{v''=1}^{w_R} gER_{i,v''}{}^*}$$

$$\overline{Q}_{Ri}{}^* = \frac{\sum\limits_{v''=1}^{w_R} QR_{i,v''}{}^* \cdot gRR_{i,v''}{}^* + \sum\limits_{v=1}^{w_B} QB_{i,v}{}^* \cdot gRB_{i,v}{}^* + \sum\limits_{v'=1}^{w_E} QE_{i,v'}{}^* \cdot gRE_{i,v'}{}^*}{\sum\limits_{v''=1}^{w_R} gRR_{i,v''}{}^* + \sum\limits_{v=1}^{w_B} gRB_{i,v}{}^* + \sum\limits_{v'=1}^{w_E} gRE_{i,v'}{}^*}$$

where $gBB_{i,v}{}^*$, $gEE_{i,v'}{}^*$, $gRR_{i,v''}{}^*$, $gBE_{i,v'}{}^*$, $gBR_{i,v''}{}^*$, $gEB_{i,v}{}^*$, $gER_{i,v''}{}^*$, $gRB_{i,v}{}^*$ and $gRE_{i,v'}{}^*$, are weighting factors determining the degree to which the quality factors contribute in obtaining average quality factors for a signal obtained at frequency $f_i$.

It is essential that the (average) quality factors in this case are digital figures, the magnitude of which is a parameter. Thus it can be defined, for example: the higher a quality factor, the higher the quality of the accompanying signal. The weighting factors thus determine the degree to which a quality aspect of an error signal contributes to the ultimate total assessment of the quality of the error signal. If the average quality factors are determined as indicated above, the signal processing unit is further characterised in that the signal processing unit on the basis of the successively supplied total quality factors $\overline{Q}_{Bi}{}^*$, $\overline{Q}_{Ei}{}^*$ and $\overline{Q}_{Ri}{}^*$ (i=1,2, ... ,n), determines the value of h where $\overline{Q}_{Bh} \geq \overline{Q}_{Bi}{}^*$ for i=1,2, ... ,n and h$\epsilon$\{1,2, ... ,n\}; determines the value of j where $\overline{Q}_{Ej}{}^* \geq \overline{Q}_{Ei}{}^*$ for i=1,2, ... ,n and j$\epsilon$\{1,2, ... ,n\}; determines the value of k where $\overline{Q}_{Rk}{}^* \geq \overline{Q}_{Ri}{}^*$ for i=1,2, ... ,n and k$\epsilon$\{1,2, ... ,n\}, and where $\Delta B_{i=h}{}^*$, $\Delta E_{i=j}{}^*$ and $\Delta R_{i=k}{}^*$ are continuously selected for generating the target-representing signals and where $p_B$, $p_E$ and $p_R$ $\epsilon$ \{1,2, ... \}.

According to this modern digitised embodiment of the invention, every $\Delta T = 1/f_s$ second or multiples thereof, sampled components $\Delta B_h{}^*$, $\Delta E_j{}^*$ and $\Delta R_k{}^*$ comprising the best quality are selected. The target-representing signal thus generated during a certain time span comprises a set of best target signals present at any moment. Thus it is possible that $\Delta B_h{}^*$ at a first point in time originates from the transmitted radar pulses having frequency $f_2$ and, a time span equal to the sampled frequency or a multiple thereof, originates from an infrared observation. The same applies to $\Delta R_k{}^*$. The digitised figures $\Delta R_h{}^*$ may subsequently originate from different target signals. $\Delta E_j{}^*$ also concerns a sequence of selected best digitised target signal components $\Delta E_i{}^*$. If these signals ($\Delta B_h$, $\Delta E_j$, $\Delta R_h$) are supplied to a digital filter process, or to a D/A converter to obtain analogue target-representing signals, the processing taking place suppresses high-frequency jamming components as a result of very rapid switching between the different target signals. For the latter feature the signal processing unit is provided with a D/A converter for generating a first component $\Delta B$ of the target-representing signal from the successive signals $\Delta B_h{}^*$, and for generating a second component $\Delta E$ of the target-representing signal from the successive signals $\Delta E_j{}^*$ and for generating a third component $\Delta R$ of the target-representing signal from the successive signals $\Delta R_k{}^*$. Averaging takes place in the time domain, as opposed to the above-described analogue embodiment in which direct instantaneous averaging takes place.

Thus, according to the last-mentioned method, an analogue target-representing signal is obtained with components $\Delta B$, $\Delta E$, $\Delta R$. When the target-representing signals are analogue, they can be used ($\Delta B$ and $\Delta E$) to drive servo motors for keeping the emission and detection device, in case of radar comprising an antenna device, aimed at the target. The target detector concerns in that case a target tracking detector, where the electromagnetic waves having different frequencies, are transmitted in the same direction, if necessary by means of the emission and detection device. Component $\Delta R$ can be used for adjusting in a well known manner a range gate of the target detector for the purpose of radar and laser signals. It is also possible to use the target-representing signal for controlling a fire control computer in a well-known manner. If the emission and detection device is provided with rotation means, the target detector can be used as a target search detector with which a track can be built-up in a well-known manner.

It is obvious that according to the invention embodiments are possible in which the quality factors are analogue and the target-representing signals are digital or vice versa. The signal processing unit of such a target detector is characterised in that the signal processing unit, on the basis of the supplied sets of quality factors $\overline{Q}_{Bi}$, $\overline{Q}_{Ei}$ and $\overline{Q}_{Ri}$ (i=1,2, ... ,n), determines the value of h for which $\overline{Q}_{Bh} \geq \overline{Q}_{Bi}$ for i=1,2, ... ,n and h $\epsilon$ \{1,2, ... ,n\}; determines the value of j for which $\overline{Q}_{Ej} \geq \overline{Q}_{Ei}$ for i=1,2, ... ,n and j $\epsilon$ \{1,2, ... ,n\}; determines the value of k for which $\overline{Q}_{Rk} \geq \overline{Q}_{Ri}$ for i=1,2, ... ,n and k $\epsilon$ \{1,2, ... ,n\}, where $\Delta B_{i=h}{}^*$, $\Delta E_{i=j}{}^*$ and $\Delta R_{i=k}{}^*$ are continuously selected for generating the target-representing signals and where $p_B$, $p_E$ and $p_R$ $\epsilon$\{1,2, ... \}.

According to a special embodiment, the magnitude of the quality factors does not indicate the quality aspect of a signal as described above. The quality factors can then assume the values 0 or 1. indicating whether a certain quality threshold has been passed, or whether another criterion has been satisfied. An example of such an embodiment is characterised in that the quality factors $QB_{i,v}{}^*$, $QE_{i,v'}{}^*$, $QR_{i,v''}{}^*$ with $v = v' = v'' = 1$ assume the value 1 if jamming is present in the received signals having frequency $f_i$ and assume the value 0 in all other cases; the quality factors $QB_{i,v}{}^*$, $QE_{i,v'}{}^*$, $QR_{i,v''}{}^*$ with $v = v' = v'' = 2$ assume the value 1 if the signal-to-noise ratios are better than a first set of three threshold values and assume the value 0 in all other cases;

the quality factors $QB_{i,v}{}^*$, $QE_{i,v'}{}^*$, $QR_{i,v''}{}^*$ with $v = v' = v'' = 3$ assume the value 1 if the signal-to-noise ratios are better than a second set of three threshold values and assume the value 0 in all other cases;

the quality factors $QB_{i,v}{}^*$, $QE_{i,v'}{}^*$, $QR_{i,v''}{}^*$ with $v = v' = v'' = 4$ assume the value 1 if the clutter amounts exceed a third set of three threshold values and assume the value 0 in all other cases, and where the quality factors $QB_{i,v}{}^*$, $QE_{i,v'}{}^*$, $QR_{i,v''}{}^*$ with $v = v' = v'' = 5$ assume the value 1 if the clutter amounts exceed a fourth set of three threshold values and assume the value 0 in all other cases. The said threshold values can in this case be made dependent on factors such as the amount of rain and the range of the target. If rain is present, the threshold values relating to the signal-to-noise ratio can for instance be increased, while they can be decreased as a target approaches.

The said threshold values may either be of the predetermined type or be made dependent on the properties of the received signals via a feed-back circuit. If, for example, no error signal turns out to satisfy the minimum signal-to-noise ratio requirements, such a threshold may be decreased to allow error signals to be passed for further processing.

Because the quality factors are either 0 or 1, the signal processing unit according to this embodiment is characterised in that the signal processing unit continuously selects signals $\Delta B_{i=h}^*$, $\Delta E_{i=j}^*$ and $\Delta R_{i=k}^*$, where on the basis of the supplied set of quality factors $QB_{i,v}^*$, $QE_{i,v'}^*$, $QR_{i,v''}^*$ ($i=1,2,\ldots,n$; $v=1,2,\ldots,w_B$; $v'=1,2,\ldots,w_E$; $v''=1,2,\ldots,w_R$) the value of h is continuously determined according to a logical function $f_B$ with as arguments the said quality factors, the value of j is continuously determined according to a logical function $f_E$ with as arguments the said quality factors, and the value of k is continuously determined according to a logical function $f_R$ with as arguments the said quality factors.

Here too, after digital filtering or D/A conversion, averaging takes place in the time domain.

According to an embodiment of the invention comprising different types of sensors, the transmitter means are suitable for generating q radar pulse sequences i having frequency $f_i$ where $i=1,2,\ldots,q$ and $q \leq m$, and for generating (m-q-1) laser pulse sequences i having frequency $f_i$ with $i=q+1,\ldots,m$, where the receiving and emission means are suitable for receiving target echo signals originating from pulse sequences transmitted by the transmitting means and the receiving and emission means, which pulse sequences have frequency $f_i$ ($i=1,2,\ldots,m$), and where the receiving means generate $\Delta B_{i,v} = \Delta E_{i,v'} = 0$ for $i=q+1,\ldots,m$. In this embodiment the target detector may be further improved if the receiving and emission means are provided with (n-m-1) sensors for receiving light signals originating from the target and where the receiving means are suitable for processing the signals received by the sensors and generate $\Delta R_{i,v''} = 0$ for $i=m+1,\ldots,n$.

Owing to the modular construction of the target detector, the target detector can, if necessary, be extended with new sensors or even sensors to be developed in the future. The target detector setup is so flexible that its possibilities are practically unlimited. Individual requirements can be realised without problems. Moreover, the electromagnetic waves transmitted may be of the pulsed type and/or the FM-CW type. Particularly in the case of radar waves, FM-CW type waves are attractive in combination with pulsed laser waves and passive infrared.

It will therefore be clear that according to the principle of the invention, many especially advantageous target detectors can be realised and that the description following hereafter is in no way a limitation of the scope of protection of the claims.

BRIEF DESCRIPTION OF THE DRAWING

The invention will now be further described with reference to the accompanying figures, of which:

FIG. 4 shows a part of a possible interpretation of a truth table according to which the selection unit of FIG. 3 selects signals;

DESCRIPTION OF THE PREFERRED EMBODIMENTS

Figure 1:
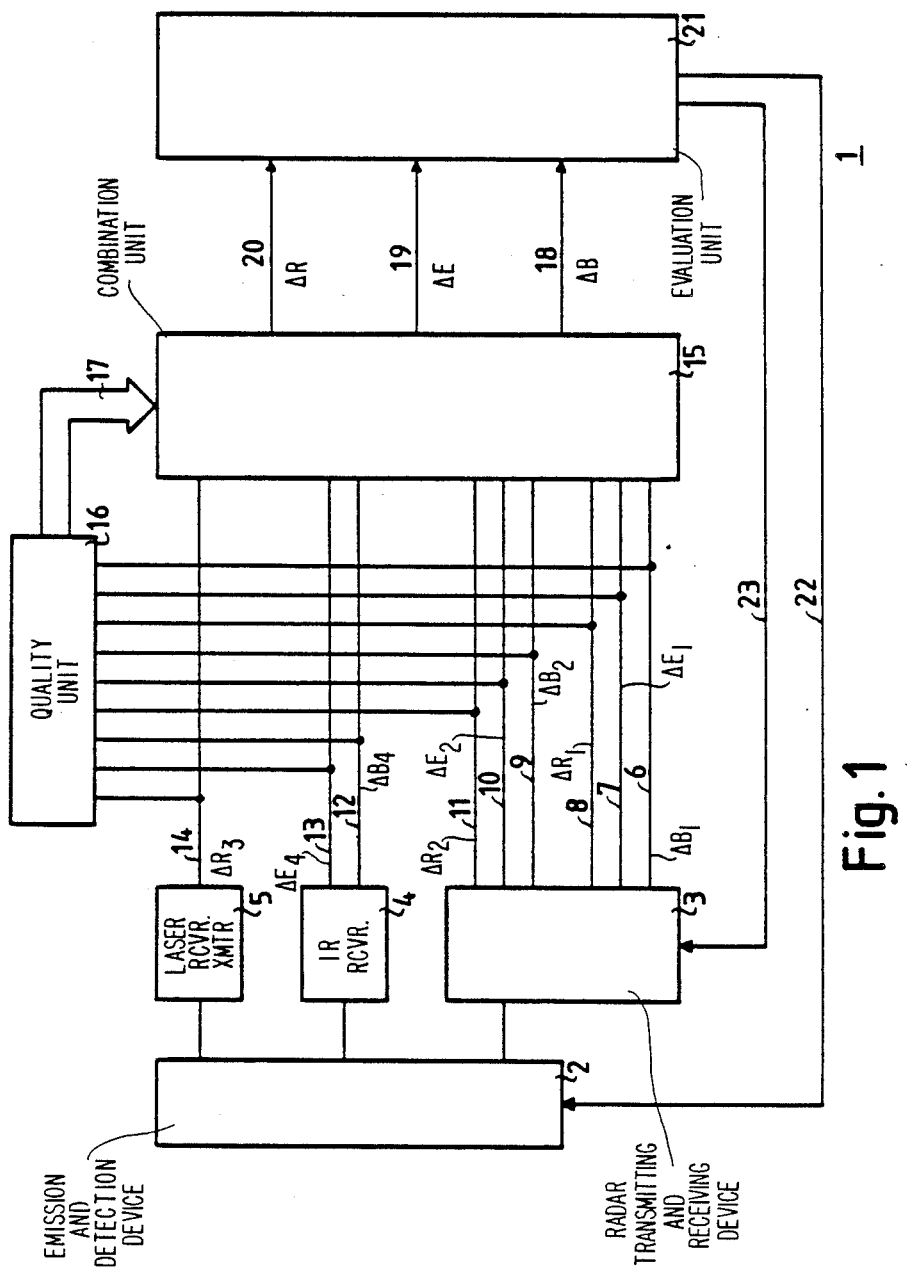
FIG. 1 is an embodiment of the target detector according to the invention.

FIG. 1 shows a target detector 1. The target detector is provided with a directable and/or rotatable emission and detection device 2. The emission and detection device 2 is provided with microwave reflection means, not indicated in the figure, for transmitting and receiving microwave radiation by means of a radar transmitting and receiving device 3. The radar transmitting and receiving device 3 is in the present embodiment is suitable for microwave radiation at two different frequencies in the X and Ka band respectively. The transmitted microwaves can be either of the pulsed or of the FM-cW type.

The emission and detection device 2 is further provided with an infrared sensor supplying IR signals to an IR receiver 4. Finally, the emission and detection device 2 is provided with a laser and an accompanying laser sensor, supplying reflected laser pulses to a laser receiver unit 5. The emission and detection device is suitable for receiving microwave, infrared and laser signals from one and the same direction. The radar transmitting and receiving device 3 generates signals $\Delta B_1$, $\Delta E_1$ and $\Delta R_1$, respectively supplying azimuth, elevation and range information of the target. The information is obtained at frequency f1 in the X band and is available for further processing on lines 6, 7 and 8 (see FIG. 1). Signals $\Delta B_2$, $\Delta E_2$ and $\Delta R_2$ generated by the radar transmitting and receiving device 3 and relating to the said target are available on lines 9, 10 and 11. The latter information, however, is obtained at frequency $f_2$ in the Ka band. Lines 12 and 13 respectively contain signals $\Delta B_4$ and $\Delta E_4$ relating to azimuth and elevation information of the target obtained in the infrared area. Finally, line 14 supplies a signal $\Delta R_3$ relating to range information of the target ($g=2$, $m=3$, $n=4$) obtained by means of the laser device 5. The signals on lines 6-14 are supplied to a combination unit 15 and a quality unit 16. The quality unit 16 assesses the quality of the signals on lines 6-14, on the basis of which a combination unit 15 is instructed via bus 17 as to the way in which signals $\Delta B_1$, $\Delta B_2$ and $\Delta B_4$ are to be processed to obtain target-representing signal $\Delta B$ on line 18. Similarly, quality unit 16 determines the way in which signals $\Delta E_1$, $\Delta E_2$ and $\Delta E_4$ are to be processed to obtain a target-representing signal $\Delta E$ on line 19 and the way in which signals $\Delta R_1$, $\Delta R_2$ and $\Delta R_3$ are to be processed (combined) to obtain a target-representing signal $\Delta R$ on line 20. The signals $\Delta B$, $\Delta E$ and $\Delta R$ are supplied to an evaluation unit 21 for further processing. It will be clear that by means of time sharing lines 6-14 can be combined to one bus. To ensure that error signals can be properly distinguished, we will not describe a target detector operating on a time-sharing basis.

If the target detector concerns a tracking unit, the evaluation unit 21 will send servo signals to a servo unit belonging to the emission and detection device via line 22 for the purpose of keeping the emission and detection device aimed at the target. The servo signals are determined by $\Delta B$ and $\Delta E$. To keep a target in track, a range gate of the radar transmitting and receiving device 3 may be sat by evaluation unit 21 via line 23. The signals on line 23 are generated by the evaluation unit on the basis of the $\Delta R$ signals supplied. For this purpose, the evaluation unit is provided with well-known tracking means. The evaluation unit can also generate signals for controlling a fire control computer not indicated in FIG. 1. In that case the fire control computer calculates, on the basis of target-representing signals $\Delta B$, $\Delta E$, $\Delta R$, the orientation and firing moment of a gun to ensure that the target is hit by the fired projectile. This process concerns well-known means and techniques which will not be further specified here.

However, if the target detector concerns a search system, line 22 can be canceled. The emission and detection device 2 in that case rotates in order to search the environment. The evaluation unit 21 will then be suitable for compiling an air picture which may comprise various targets. The evaluation unit may be provided with, for instance, well-known ATG systems.

Figure 2:
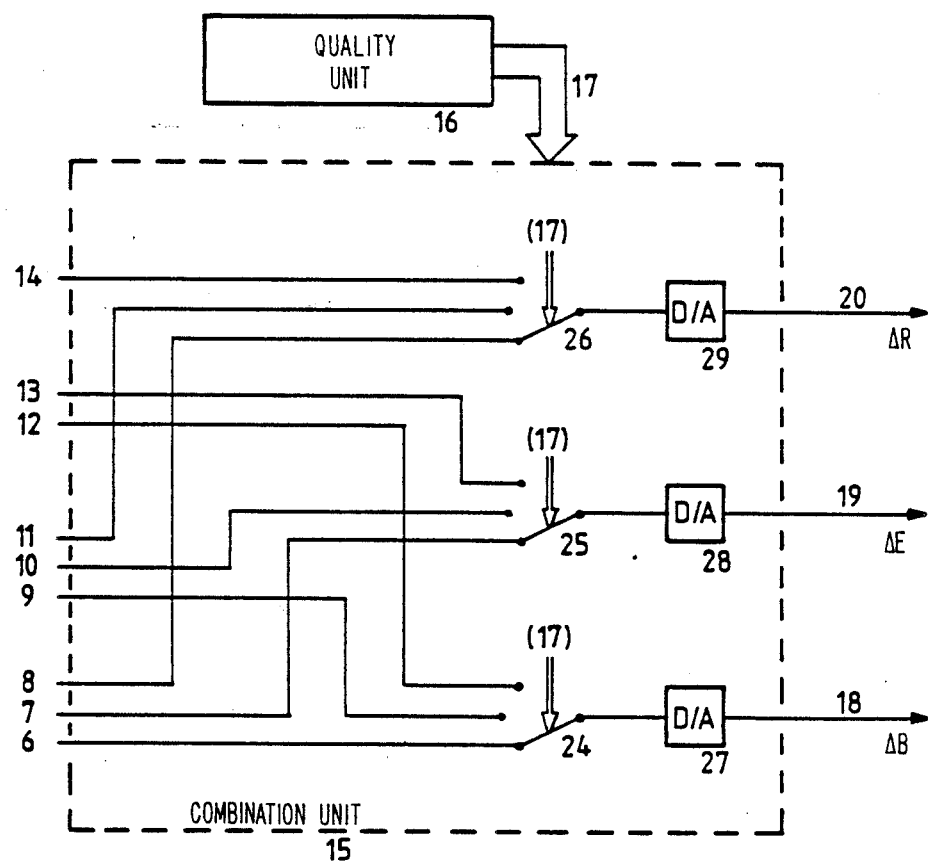
FIG. 2 is a first possible embodiment of the combination unit of FIG. 1.

FIG. 2 shows a possible embodiment of the combination unit 15. For this embodiment the receiving means 3, 4 and 5 (FIG. 1) are provided with an A/D conversion unit to supply digital signals $\Delta B_1^*$, $\Delta E_1^*$, $\Delta R_1^*$, $\Delta B_2^*$, $\Delta E_2^*$, $\Delta R_2^*$, $\Delta B_4^*$, $\Delta E_4^*$ and $\Delta R_3^*$. The sample frequency is $f_s$. In a special embodiment, $f_s$ may be the same as the pulse repetition frequency of the radar transmitting and receiving device 3. In the combination unit 15, the signals $\Delta B_1^*$, $\Delta B_2^*$ and $\Delta B_4^*$ are supplied to a switching means 24 via lines 6, 9 and 12. Similarly, the signals $\Delta E_1^*$, $\Delta E_2^*$ and $\Delta E_4^*$ are supplied to a switching means 25 via lines 7, 10 and 13 and signals $\Delta R_1^*$, $\Delta R_2^*$ and $\Delta R_3^*$ are supplied to a switching means 26. Switching means 24, 25 and 26 are controlled by quality unit 16. In this example of an embodiment, the quality unit selects every $\Delta t = 1/f_s$ seconds the best signal $\Delta B_h^*$, (h=1, 2 or 4) of the signals $\Delta B_1^*$, $\Delta B_2^*$ and $\Delta B_4^*$ arriving each $\Delta t = 1/f_s$ seconds. The quality unit 16 selects, via bus 17, by means of switching means 24, the signal $\Delta B_h^*$, for further processing. Thus, in accordance with a quality standard yet to be determined, by means of switching means 24, each $\Delta t$ seconds the best signal $\Delta B_h^*$, is selected for further processing. The selected signals $\Delta B_h^*$, are subsequently supplied to a D/A conversion unit 27 to obtain signal $\Delta A$ on line 18. Similarly, the selected signals $\Delta E_j^*$, $\Delta R_k^*$ are supplied to the D/A conversion units 28 and 29 respectively to obtain signals $\Delta E$ and $\Delta R$ on lines 19 and 20. The values h, j and k are selected individually and may therefore assume different values.

If a target is situated at a long distance from the target detector, it is obvious that quality unit 16 selects $\Delta B_1^*$ every $\Delta t$ seconds to detect a target. If the target is situated at a short distance, signal $\Delta B_2^*$ will give the best result in suppressing the mirror effect in connection with the smaller beam of the Ka band with compared with the Y band (see for instance GB No. 1.413.976). However, under favourable weather conditions, the azimuth information obtained with an infrared sensor at a short distance is known to be superior to azimuth determination by means of radar. Thus the quality unit 16, depending on other quality aspects such as signal-to-noise ratio, will preferably select $\Delta B_1^*$ for long-distance target spotting, will select $\Delta B_2^*$ for short-distance target spotting and will select $\Delta B_4^*$ or $\Delta B_2^*$ for target spotting at very short distances. In the transition area between the use of X and Ka band, it is possible that every $\Delta t$ seconds $\Delta B_1^*$ and $\Delta B_2^*$ are selected alternately. Because the selected signals are supplied to the D/A conversion unit 27 however, averaging takes place over a successively selected value of $\Delta B_1^*$ to filter out irregularities resulting from the high-frequency switching of switching means 24 and to obtain a gradual transition from e.g. X-band detection to Ka-band detection or IR detection.

Figure 3:
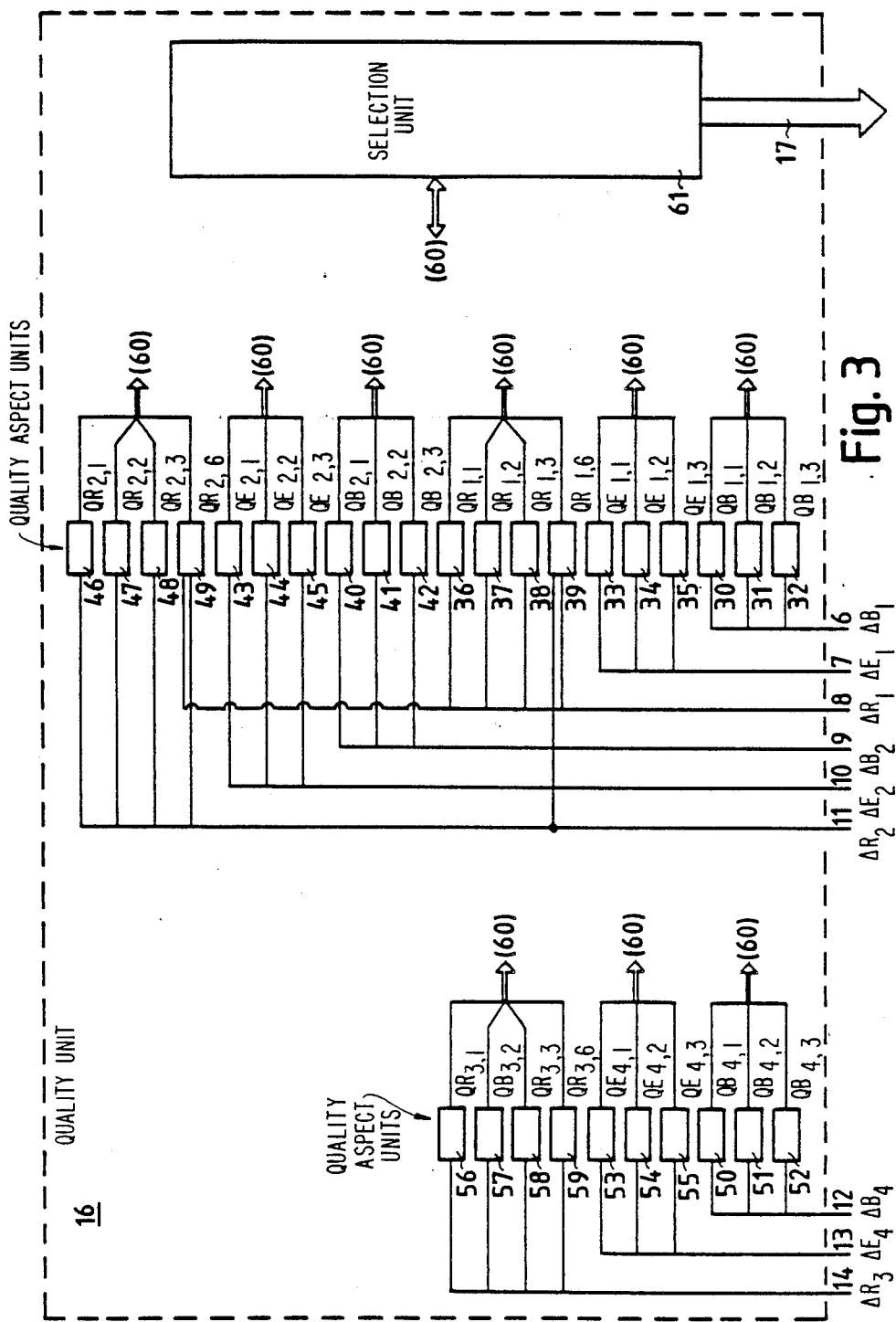
FIG. 3 is a first possible embodiment of the quality unit of FIG. 1.

FIG. 3 shows a possible embodiment of a quality unit. In this case, the quality factors are logical operators indicating that a quality threshold has been exceeded or that another quality criterion has been satisfied. In FIG. 3 the sampled and digitised signals $\Delta B_1^*$ are supplied to quality aspect units 30–32 via line 6. The first quality aspect unit 30 gives logical value $QB_{1,1}^* = 1$ when the amplitude of $\Delta B_1^*$ shows that a jammer is present on frequency $f_1$. If no jammer is present, $Q_{1,1}^* = 0$ is generated. The second quality aspect unit 31 gives logical value $QB_{1,2}^*$ when the signal-to-noise ratio of $\Delta B_1^*$ proves to be higher than a predetermined value of $A^0$ dB. For this purpose, quality aspect unit 31 is provided with well-known means for determining the signal-to-noise ratio. If the signal-to-noise ratio is lower than $A^0$ dB, $QB_{1,2}^* = 0$ is generated.

Similarly, quality aspect unit 32 generates a signal $QB_{1,3}^* = 1$ when the signal-to-noise ratio of $\Delta B_1^*$ exceeds $B^0$ dB and $QB_{1,2}^* = 0$ when the signal-to-noise ratio of $\Delta B_1^*$ is lower than $B^0$ dB.

In a fully analogous way, signal $\Delta E_1^*$ is supplied via line 7 to quality aspect units 33, 34 and 35, which generate quality factors $QE_{1,1}^*$. $QE_{1,2}^*$ and $QE_{1,3}^*$, respectively relating to jamming, signal-to-noise ratio with respect to a predetermined value of $A^1$ dB and the signal-to-noise ratio with respect to a predetermined value of $B^1$ dB. In a simple embodiment, $A^0 = A^1$ and $B^0 = B^1$ may be selected. This will be the case particularly when the quality of identical signals is to be assessed and tested against the same quality criterion.

Signal $\Delta R_1^*$ is supplied via line 8 to quality aspect units 36–39 for generating quality factors $QR_{1,1}^*$, $QR_{1,2}^*$, $QR_{1,3}^*$ and $QR_{1,4}^*$. The quality aspect units 36–38 are functionally identical to quality aspect units 30–32. Quality aspect units 37 and 38 comprise threshold values $A^2$ and $B^2$ respectively, with $B^2 > A^2$. Quality aspect unit 39, on the other hand, relates to a quality aspect concerning an alignment error between the X and Ka band radar. Quality aspect unit 39 gives a signal $QR_{1,6}^* = 1$ when $\Delta R_1^* + R_0 < \Delta R_2^*$, where $R_0$ is a predetermined value. In all other cases, $QR_{1,6}^* = 0$ is generated. $QR_{1,6}^*$ therefore concerns a quality factor relating to a quality aspect of $\Delta R_1^*$, but obtained on the basis of $\Delta R_1^*$ and $\Delta R_2^*$, The above-mentioned quality factors on the other hand were obtained from the signal to which the relevant quality factor pertains.

The quality aspect units 40, 41 and 42 for signal $\Delta B_2^*$, which generate the quality factors $QB_{2,1}^*$. $QB_{2,2}^*$ and $QB_{2,3}^*$ and relate to the quality aspects of signal $\Delta B_2^*$, are functionally identical to the quality aspect units 30, 31 and 32. Quality aspect units 41 and 42 comprise threshold values $A^3$ and $B^3$ respectively, with $B^3 > A^3$.

Similarly, the quality aspect units 43, 44 and 45, which generate the quality factors $QE_{2,1}^*$, $QE_{2,2}^*$ and $QE_{2,3}^*$ and relate to quality aspects of signal $\Delta E_2^*$, are functionally identical to quality aspect units 33, 34 and 35. The quality aspect units 44 and 45 comprise threshold values $A^4$ and $B^4$ respectively, with $B^4 > A^4$.

The quality aspect units 46–49, which generate the quality factors $QR_{2,1}^*$, $QR_{2,2}^*$, $QR_{2,3}^*$ and $QR_{2,6}^*$ and relate to the various quality aspects of $\Delta R_2^*$, are functionally identical to the quality aspect units 36–39, where $QR_{2,6}^*$ is 1 if $\Delta R_2^* + R_0 < \Delta R_1^*$. Quality aspect units 47 and 48 comprise threshold values $A_5$ and $B_5$ respectively, with $B^5 > A^5$. Signal $\Delta B_4^*$ is supplied to quality aspect units 50, 51 and 52 via line 12 for generating quality factors $QB_{4,1}^*$, $QB_{4,2}^*$ and $QB_{4,3}^*$, where quality aspect units 50, 51 and 52 respectively are functionally identical to the quality aspect units 30, 31 and 32. The quality aspect units 51 and 52 comprise threshold values $A^6$ en $B^6$ respectively, with $B^6 > A^6$. Similarly, signal $\Delta E_4^*$ is supplied to quality aspect units 53, 54 and 55 for generating quality factors $QE_{4,1}^*$, $QE_{4,2}^*$ and $QE_{4,3}^*$, where quality aspect units 53, 54 and 55 respectively are functionally identical to quality aspect units 33, 34 and 35 for generating information relating to jamming and signal-to-noise ratio. Quality aspect units 54 and 55 comprise threshold values $A^7$ and $B^7$ respectively, with $B^7 > A^7$.

Finally, the laser range information $\Delta R_3^*$ is supplied to quality aspect units 56–59 via line 14.

The quality aspect unit 56 gives a signal $QR_{3,1}^* = 1$ when jamming is present on frequency $f_4$. If no jamming occurs (i.e. when the amplitude of $\Delta R_3^*$ is below a certain threshold value) $QR_{3,1}^* = 0$ is generated.

The quality aspect unit 57 gives a signal $QR_{3,2}^* = 1$ when the signal-to-noise ratio of signal $\Delta R_3^*$ is better than $A^8$ dB, while quality aspect unit 58 generates a signal $QR_{3,3}^* = 1$ when the signal-to-noise ratio of the signal $\Delta R_3^*$ is better than $B^8$ dB, with $B^8 > A^8$. If the above-mentioned conditions are complied with, $QR_{3,3}^* = 0$ and/or $QR_{3,2}^* = 0$ are generated.

The quality aspect unit 59 generates a signal $QR_{3,6} = 1$ when $\Delta R_3^* \leq R_0'$, where $R_0'$ is a predetermined value. In case $\Delta R_3^* \leq R_0'$, $QR_{3,6}^* = 0$ is generated.

If $QR_{3,6}^* = 1$, this means that the laser information (except for the signal-to-noise ratio) is particularly accurate, because the laser used in this device is specially suitable for short-range observations.

According to a practical embodiment of the target detector, the threshold values will be $A^0 = A^1 = A^2$ and $B^0 = B^1 = B^2$ because they all relate to signals received on the same frequency. Similarly, $A^3 = A^4 = A^5$ and $B^3 = B^4 = B^5$ may be selected. Finally, $A^6 = A^7$ and $B^6 = B^7$ may be selected because they relate to signals which have all been received by means of the same passive sensor. For simplicity's sake however, it will be assumed that $A^i = A$ (i=1−8) and $B^i = B$ (i=1−8), which does not impose any limitation on the target detector discussed below.

The quality factors generated as described above are supplied to a selection unit 61 via bus 60. This supply can take place in a well-known manner on a time-sharing basis. Every $1/f_s$ seconds the selection unit receives a new set of quality factors on the basis of which every $1/f_s$ seconds new positions of switching means 24, 25 and 26 (FIG. 2) are selected (via bus 17).

A possible functional embodiment of the combination unit, which determines how quality factors are processed in combination, consists of a logical function $F_B$ which, on the basis of the quality factors supplied, determines a value of h (h=1, 2 or 4), implying that $\Delta B_h^*$, is selected for further processing. Similarly, a logical function $F_E$, supplied with quality factors, determines a value of j (j=1, 2 or 4), implying that $\Delta E_j^*$ is selected for further processing. A logical function of $F_R$, supplied with quality factors, determines the value of k (k=1, 2 or 3), implying that $\Delta R_k^*$ is selected for further processing. The logical functions $F_B$, $F_E$ and $F_R$ can be indicated in a truth table. FIG. 4 shows a part of a possible realisation of such a truth table. Because the signals $\Delta B_3^*$, $\Delta E_3^*$ and $\Delta R_4^*$ in this example are not generated (i.e. permanently equal to zero), quality factors $QB_{3,a}$, $QE_{3,a}$ and $QR_{4,a}$ (a=1, 2, 3 or 6), are always zero. Consequently, the truth table does not include these quality factors. Quality factors $QB_{1,6}$, $QE_{1,6}$, $QB_{2,6}$, $QE_{2,6}$, $QB_{4,6}$ and $QE_{4,6}$ are also always zero, because they represent a quality aspect relating to range, where the quality aspect would have been obtained on the basis of azimuth or elevation measurement. Further completion of such a truth table is however entirely up to the ideas of the designer. If e.g. $QB_{1,1} = 1$, we can conclude that a jammer is present at frequency $f_1$. This implies that $\Delta B_1^*$, $\Delta E_1^*$ and $\Delta R_1^*$ can no longer ba used, irrespective of the other quality factors $QB_{1,v}$, $QE_{1,v'}$, $QR_{1,v''}$ and $QR_{2,6}$ with v=2, 3, 6, v'=1, 2, 3, 6 and v''=1, 2, 3, 6. In the first column of the truth table this is indicated with "−". If the other signals are not jammed $(QB_{2,1} = QE_{2,1} = QR_{2,1} = QR_{3,1} = QB_{4,1} = QE_{4,1} = 0)$ they can be freely disposed of and a selection may be made on the basis of signal-to-noise ratios. If e.g. the signal-to-noise ratio of $\Delta B_2^*$ proves to be better than B dB $(QB_{2,2} = QB_{2,3} = 1)$, while the signal-to-noise ratio of $\Delta B_4^*$ is below A dB $(QB_{4,2} = QB_{4,3} = 0)$, $\Delta B_2^*$ will be selected for further processing (see top truth table). If, on the other hand, the signal-to-noise ratio of $\Delta E_2^*$ is between A and B dB $(QE_{2,2} = 1, QE_{2,3} = 0)$, while the signal-to-noise ratio of $\Delta E_4^*$ is better than B dB $(QE_{4,2} = QE_{4,3} = 0)$. $\Delta E_4^*$ will be selected for further processing (see top truth table). If the signal-to-noise ratio of $\Delta R_2^*$ and $\Delta R_3^*$ is better than B dB $(QR_{2,2} = QR_{2,3} = QR_{3,2} = QR_{3,3})$ and if $\Delta R_3^*$ indicates a range shorter than $R_0'$ meter $(QR_{3,6} = 1)$, $\Delta R_3^*$ will be selected for further processing.

Thus one possible situation is indicated in column 1 of FIG. 4, including the accompanying positions of switching means 24, 25 and 26. Column 2 shows a second possible situation including the accompanying positions of switching means 24, 25 and 26. Because in column 2 the situation occurs in which on frequencies $f_2$, $f_3$ and $f_4$ a jammer occurs $(QB_{2,1} = QE_{2,1} = QR_{2,1} = QR_{3,1} = QB_{4,1} = QE_{4,1} = 1)$, while on frequency $f_1$ no jammer is found $(QB_{1,1} = QE_{1,1} = QR_{1,1} = 0)$, signals $\Delta B_1^*$, $\Delta E_1^*$ and $\Delta R_1^*$ are used to obtain target-representing signals, irrespective of the other quality factors ("−").

Thus a truth table can be made up for any type of situation. Because, however, this is a question of design, taste and preference of the user, we will not discuss this further. It is also possible to extend the truth table with quality factors $QB_{i,r}$, $QE_{i,r}$, $QR_{i,r}$ (i=1, 2 or 3 and r=4, 5), where e.g. $QB_{1,4}$ (r=4) contains information on the clutter level in signal $\Delta B_1^*$ with respect to a first threshold and $QE_{2,p}$ contains information of the clutter level in signal $\Delta E_2^*$ with respect to a second threshold. To determine the clutter levels in signals $\Delta B_1$, $\Delta E_1$, $\Delta R_1$, $\Delta B_2$, $\Delta E_2$ and $\Delta R_2$, twelve extra quality aspect units are included for determining the clutter level in the quality unit of FIG. 3 (not indicated in FIG. 3). The said quality aspect units in their simplest embodiment may be provided with predetermined threshold values.

It is however also possible to provide the quality aspect units with adjustable threshold values. If, for instance in the quality aspect units having a noise threshold value of $A^i$ dB (i = 1–8) it appears that during a certain time span this threshold value is not exceeded at all, the noise threshold may be decreased to such an extent that at least a part of the supplied signals exceeds the new noise threshold value of $A^i - \Delta A^i$ dB. For this purpose, the selection unit may be additionally provided with a logical function $F_{DL}$ which, supplied with the quality factors $QB_{1,2}$, $QE_{1,2}$, $QR_{1,2}$, $QB_{2,2}$, $QE_{2,2}$, $QR_{2,2}$, $QB_{4,2}$, $QE_{4,2}$ and $QR_{3,2}$, assumes value 1 if the said quality factors assume the value 0. If at least one of these quality factors assumes the value 1, the logical function FDL assumes the value 1. Via bus 60 of FIG. 3, now functioning as a feed-back circuit of the selection unit 61 to quality aspect units 20–56, the threshold values of the quality aspect units are decreased if $F_{DL}$ assumes the value 1. Thus the target detector of the system is adapted. Fully analogously, a logical function $F_{DH}$ is implemented assuming the value 1 if all the said quality factors assume the value 1.

If at least one of the said quality factors assumes the value 0, $F_{DH}$ also assumes the value 0. Via bus 60 of FIG. 3, functioning as a feed-back circuit of the selection unit 61 to quality aspect units 20–56, the relevant threshold values $A^i$ dB are increased with $\Delta A^i$ dB if function $F_{DH}$ assumes the value 1. In a special embodiment, the threshold values of the different quality aspect units may also be adjusted individually.

Figure 5:
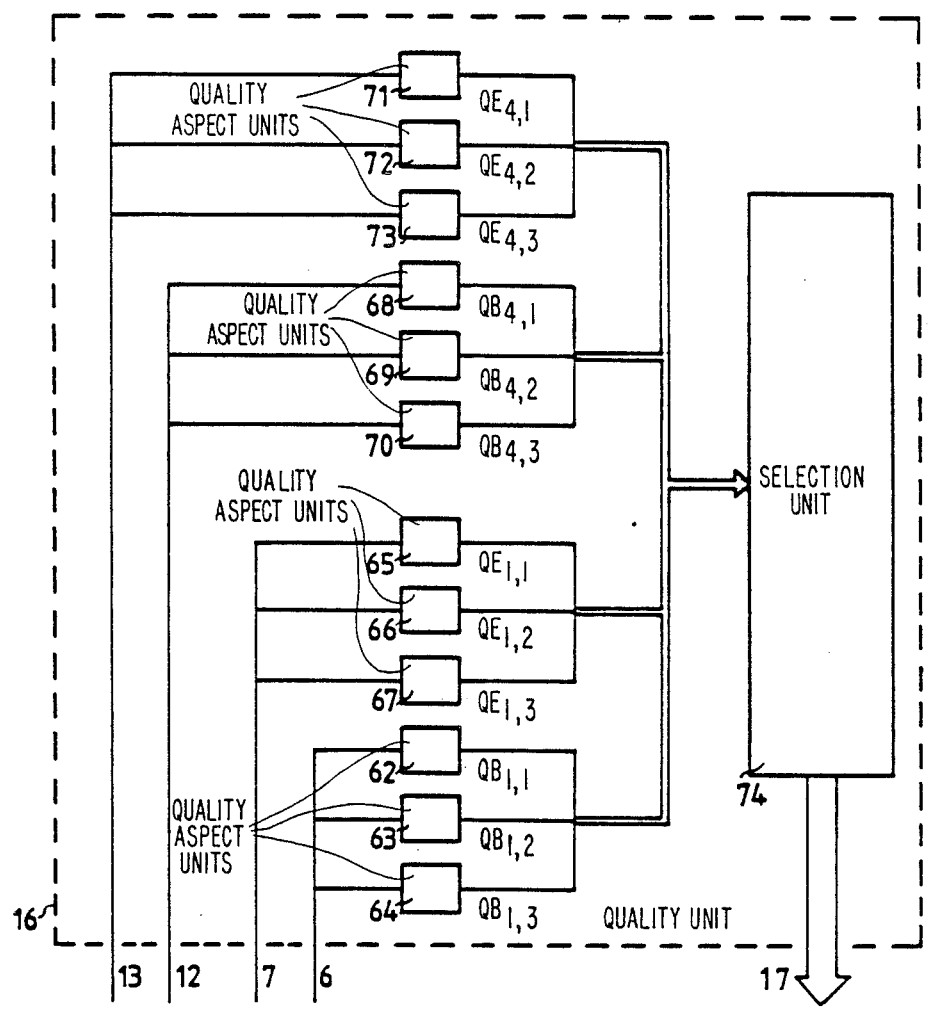
FIG. 5 is a second possible embodiment of the quality unit of FIG. 1.

FIG. 5 shows an alternative embodiment of a quality unit. The quality factors in this case are not logical operators but quantities whose magnitude is a measure for a certain quality aspect. The quality unit in this embodiment is suitable for a target detector comprising one radar and one infrared unit. This implies that in FIG. 1 and 2 the lines 9, 10, 11 and 14 are not present, while in FIG. 2 the switching means 24 and 25 comprise a two way switch for selection between $\Delta B_1^*$ and $\Delta B_4^*$ on the one hand and $\Delta E_1^*$ switching means 26 will be replaced by a fixed electrical connection. It is therefore not necessary to determine quality factors for signal $\Delta R_1^*$.

In FIG. 5, signal $\Delta B_1^*$ is supplied to a quality aspect unit 62 via line 6. The quality aspect unit 62 in this example provides a quality factor $QB_{1,1}$, whose magnitude decreases if the strength of any jammer on frequency $f_1$ increases. For this purpose, quality aspect unit 62 is provided with means determining the amplitude of signal $\Delta B_1^*$. Signal $\Delta B_1^*$ is also supplied to quality aspect unit 63 minus sign, whose magnitude is a measure for the amount of clutter. The quality factor $QB_{1,2}$ has a limited range due to an averaging operation to be carried out later to obtain average quality factors that must exceed zero. Finally, signal $\Delta B_1^*$ is also supplied to quality aspect unit 64 to generate a quality factor $QB_{1,3}$ whose magnitude is a measure of the signal-to-noise ratio of signal $\Delta B_1^*$. Via line 7, signal $\Delta E_1^*$ is supplied to quality aspect units 65, 66 and 67, which generate quality factors $QE_{1,1}$, $QE_{1,2}$ and $QE_{1,3}$. Quality aspect units 65, 66 and 67 are identical to quality aspect units 62, 63 and 64 respectively.

Via line 13, signal $\Delta B_4^*$ is supplied to quality aspect units 68, 69 and 70 to generate quality factors $QB_{4,1}$, $QB_{4,2}$ and $QB_{4,3}$, where quality aspect units 68, 69 and 70 are functionally identical to quality aspect units 62, 63 and 64 respectively. Similarly, quality aspect units 71, 72 and 73, to which signal $\Delta E_4$ is supplied for the generation of quality factors $QE_{1,4}$, $QE_{4,2}$ and $QE_{4,3}$, are functionally identical to quality aspect units 62, 63 and 64 respectively.

The said quality factors are supplied to selection unit 74, which every $1/f_s$ seconds, on the basis of the quality factors supplied, determines which signals are selected for further processing by means of switching means 24 and 25. For this purpose, the selection unit is suitable for carrying out the following calculation:

$$\overline{Q}B_1^* = \frac{gBB_{1,1}^* \cdot QB_{1,1}^* + gBB_{1,2}^* \cdot QB_{1,2}^* + gBB_{1,3}^* \cdot QB_{131}^* + gBE_{1,1}^* \cdot QE_{1,1}^*}{gBB_{1,1}^* + gBB_{1,2}^* + gBB_{1,3}^* + gBE_{1,1}^*}$$

where $\overline{Q}B_1^*$ is a quality factor indicating the average quality of a number of quality aspects of signal $\Delta B_1^*$. The weighting factors $gBB_1^*$, $gBB_2^*$, $gBB_3^*$ determine the degree to which a quality aspect of signal $\Delta B_1^*$ contributes in obtaining the so-called average quality.

The weighting factor $gBE_1^*$ has been included in connection with the fact that when a jammer is present in signal $\Delta E_1^*$, it will also be present in signal $\Delta B_1^*$. The quality factor $QB_1$ will therefore decrease. The magnitude of the weighting factors is a matter of choice and design and will not be further discussed here. They are in any case selected such that, in connection with the range of the quality factors, the average quality factor $\overline{Q}B_1^*$ always exceeds zero.

Fully analogously, average quality factors $\overline{Q}E_1^*$, $\overline{Q}E_4^*$ and $\overline{Q}B_4^*$ are determined as follows:

$$\overline{Q}E_1^* = \frac{gEE_{1,1}^* \cdot QE_{1,1}^* + gEE_{1,2}^* \cdot QE_{1,2}^* + gEE_{1,3}^* \cdot QE_{1,3}^* + gEB_{1,1}^* \cdot QB_{1,1}^*}{gEE_{1,1}^* + gEE_{1,2}^* + gEE_{1,3}^* + gEB_{1,1}^*}$$

$$\overline{Q}E_4^* = \frac{gEE_{4,1}^* \cdot QE_{4,1}^* + gEE_{4,2}^* \cdot QE_{4,2}^* + gEE_{4,3}^* \cdot QE_{4,3}^* + gEB_{4,1}^* \cdot QB_{4,1}^*}{gEE_{4,1}^* + gEE_{4,2}^* + gEE_{4,3}^* + gEB_{4,1}^*}$$

$$\overline{Q}B_4^* = \frac{gBB_{4,1}^* \cdot QB_{4,1}^* + gBB_{4,2}^* \cdot QB_{4,2}^* + gBB_{4,3}^* \cdot QB_{4,3}^* + gBE_{4,1}^* \cdot QE_{4,1}^*}{gBB_{4,1}^* + gBB_{4,2}^* + gBB_{4,3}^* + gBE_{4,1}^*}$$

Subsequently, the selection unit determines every $1/f_s$ seconds which of the average quality factors $\overline{Q}E_1^*$ and $\overline{Q}E_4^*$ is the highest. If $\overline{Q}E_1^*$ exceeds $\overline{Q}E_4^*$, it will be indicated via bus 17 that, by means of switching means 24, signal $\Delta E_1^*$ will be selected for further processing. If $\overline{Q}E_4^*$ exceeds $\overline{Q}E_1^*$, $\Delta E_4^*$ will be selected for further processing. Similarly, $\Delta B_1^*$ will be selected for further processing if $\overline{Q}B_1^*$ exceeds $\overline{Q}B_4^*$, and $\Delta B_4^*$ will be selected for further processing if $\overline{Q}B_4^*$ exceeds $\overline{Q}B_1^*$.

Figure 6:
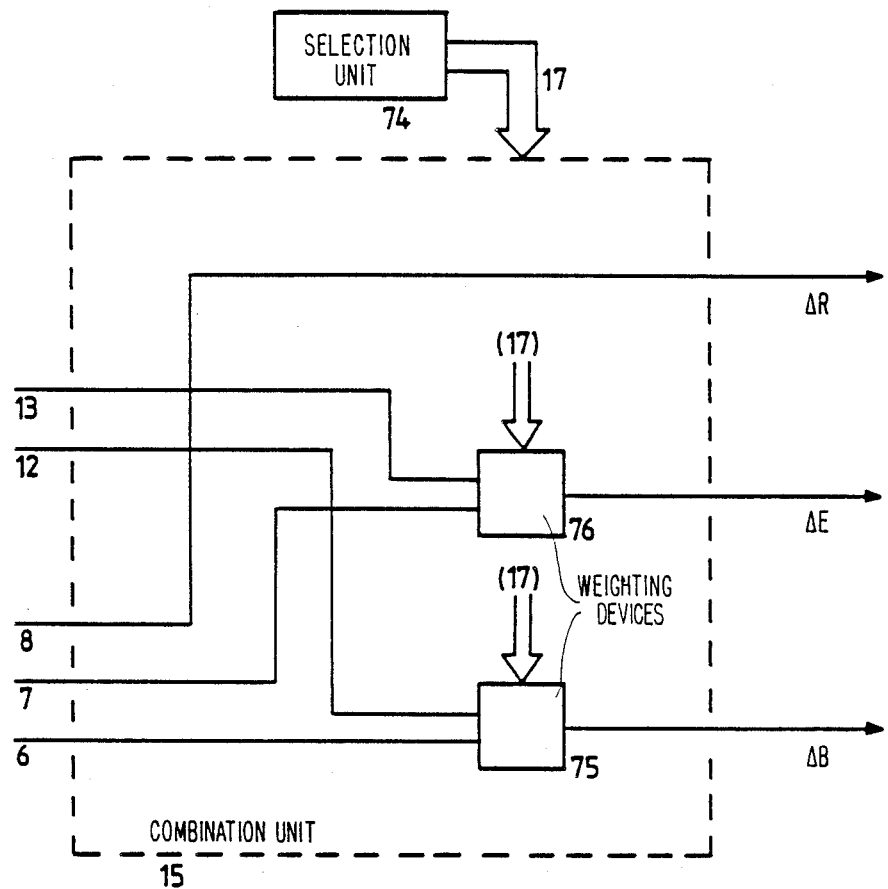
FIG. 6 is a second possible embodiment of the combination unit of FIG. 1.

An alternative embodiment of combination unit 15, which may be used in combination with e.g. the quality unit of FIG. 5, is shown in FIG. 6. Here the switching means 24 and 25 have been replaced by weighting devices 75 and 76, controlled by the selection unit 74. In this embodiment, the average quality factors $\overline{Q}B_1^*$ and $\overline{QB}_4^*$ determined by the selection unit 74 are supplied to weighting device 75 and the average quality factors $\overline{QE}_1^*$ and $\overline{QE}_4^*$ are supplied to weighting device 76. The weighting device 75 subsequently determines a weighted average $\Delta B$ of the signals $\Delta B_1^*$ and $\Delta B_4^*$ in accordance with:

$$\Delta B^* = \frac{\Delta B_1^* \cdot \overline{QB}_1^* + \Delta B_4^* \cdot \overline{QB}_4^*}{\overline{QB}_1^* + \overline{QB}_4^*}$$

Similarly, the weighting device 76 determines a weighted average $\Delta E^*$ of the signals $\Delta E_1^*$ and $\Delta E_4^*$ in accordance with:

$$\Delta E^* = \frac{\Delta E_1^* \cdot \overline{QE}_1^* + \Delta E_4^* \cdot \overline{QE}_4^*}{\overline{QE}_1^* + \overline{QE}_4^*}$$

Signals $\Delta B^*$ and $\Delta E^*$ are supplied to evaluation unit 21 for further processing.

It will be clear that, according to the invention, many embodiments are possible. The embodiments described in this specification therefore in no way limit the scope of protection of the claims.

We claim:

1. A target detector for detecting targets provided with transmitter means for the simultaneous generation of different electromagnetic waves having different frequencies which are transmitted by means of an emission and detection device, with receiving means for obtaining, by means of the emission and detection device, target signal comprising target information received at different frequencies, and with a signal processing unit for processing the target signals generated by the receiving means to obtain target-representing signals, characterised in that the signal processing unit is suitable for processing the target signals in combination to obtain the target-representing signals, said signal processing unit generating quality factors relating to the target signals, where the quality factors determine in which combination and to which degree the target signals are processed to obtain the target-representing signals.

2. A target detector as claimed in claim 1, characterised in that at least one electromagnetic wave is of the pulsed typed.

3. A target detector as claimed in claim 1 or 2, characterised in that at least one electromagnetic wave is of the FM-CW type.

4. A target detector as claimed in claim 1 characterised in that the transmitter means are suitable for generating m different sequences i having frequency $f_i$ ($i=1,2,\ldots,m$), where the receiving means, by means of target signals detected by the emission and detection device, generate error signals $\Delta B_i$ ($i=1,2,\ldots,n$) indicating the difference in azimuth value of the target with respect to the emission and detection device, error signals $\Delta E_i$ ($i=1,2,\ldots,n$) indicating the difference in elevation value of the target with respect to the emission and detection device and error signals $\Delta R_i$ ($i=1,2,\ldots,n$) indicating the range value of the target with respect to the emission and detection device, where $m \leq n$ and where $\Delta B_i$, $\Delta E_i$ and $\Delta R_i$ with $i=1,2,\ldots,m$, have been determined by means of the transmitted pulse sequence i ($i=1,2,\ldots,m$), and where $\Delta B_i$, $\Delta E_i$ and $\Delta R_i$ (with $i=m+1,\ldots,n$) have been obtained by means of the passive sensors present in the emission and detection device.

5. A target detector as claimed claim 4, in characterised in that the signal processing unit generates quality factors $Q_{Bi,v}$ indicating respectively the quality of signals $\Delta B_i$ with respect to $w_B$ different quality aspects ($v=1,2,\ldots,w_B$), quality factors $QE_{i,v'}$ which respectively indicate the quality of signals $\Delta E_i$ with respect to $w_E$ different quality aspects ($v'=1,2,\ldots,w_E$) and quality aspects $QR_{i,v''}$ which respectively indicate the quality of signals $\Delta R_i$ with respect to $w_R$ different quality aspects ($v''=1,2,\ldots,w_R$)
and where the signal processing unit processes signals $\Delta B_i$, $\Delta E_i$ and $\Delta R_i$ dependent on the quality factors to obtain the target-representing signals and where $i=1,2,\ldots,n$.

6. A target detector as claimed in one of the above claims 2–6, characterised in that the transmitter means are suitable for generating q radar waves i having frequency $f_i$, where $i=1,2,\ldots,q$ and $q \leq m$ and for generating (m-q-1) laser pulse sequences i having frequency $f_i$, with $i=q+1,\ldots,m$, where the receiving means are suitable for receiving target echo signals originating from the waves transmitted by means of the emission and detection device and having frequency $f_i$ ($i=1,2,\ldots,m$) and where the signal processing unit generates $QB_{i,v}=QE_{i,v'}=0$, for $i=q+1,\ldots,m$ and where the receiving device generates $\Delta B_i=\Delta E_i=0$ for $i=q+1,\ldots,m$.

7. A target detector as claimed in claim 2, characterised in that the emission and detection device is provided with (n-m-1) sensors for receiving light signals originating from the target and where the signal processing unit is suitable for processing signals received by the sensors and generates $QR_{i,v''}32\ 0$ for $i=m+1,\ldots,n$ and where the receiving device generates $\Delta R_i=0$ for $i=m+1,\ldots,n$.

8. A target detector as claimed in claim 4, characterised in that a number of sensors are suitable for receiving infrared signals originating from the target.

9. A target detector as claimed in claim 5, characterised in that the signals $\Delta B_i$ are processed dependent on the said quality factors to obtain a first component $\Delta B$ from the target-representing signal, signals $\Delta E_i$ dependent on the said quality factors to obtain a second component $\Delta E$ of the target-representing signal, signals $\Delta R_i$ dependent on the said quality factors to obtain a third component $\Delta R$ of the target-representing signal, and where $i=1,2,\ldots,n$.

10. A target detector as claimed in claim 9, characterised in that the signal processing unit is suitable for determining average quality factors $\overline{QB}_i$, $\overline{QE}_i$, $QR_i$ in accordance with:

$$\overline{QB}_i = \frac{\sum_{v=1}^{w_B} QB_{i,v} \cdot gBB_{i,v} + \sum_{v'=1}^{w_E} QE_{i,v'} \cdot gBE_{i,v'} + \sum_{v''=1}^{w_R} QE_{i,v''} \cdot gBR_{i,v''}}{\sum_{v=1}^{w_B} gBB_{i,v} + \sum_{v'=1}^{w_E} gBE_{i,v'} + \sum_{v''=1}^{w_R} gBR_{i,v''}}$$

-continued $$\overline{Q}E_i = \frac{\sum_{v'=1}^{w_E} QE_{i,v'} \cdot gEE_{i,v'} + \sum_{v=1}^{w_B} QB_{i,v} \cdot gEB_{i,v} + \sum_{v''=1}^{w_R} QR_{i,v''} \cdot gER_{i,v''}}{\sum_{v'=1}^{w_E} gEE_{i,v'} + \sum_{v=1}^{w_B} gEB_{i,v} + \sum_{v''=1}^{w_R} gER_{i,v''}}$$

$$\overline{Q}R_i = \frac{\sum_{v''=1}^{w_R} QR_{i,v''} \cdot gRR_{i,v''} + \sum_{v=1}^{w_B} QB_{i,v} \cdot gRB_{i,v} + \sum_{v'=1}^{w_E} QE_{i,v'} \cdot gRE_{i,v'}}{\sum_{v''=1}^{w_R} gRR_{i,v''} + \sum_{v=1}^{w_B} gRB_{i,v} + \sum_{v'=1}^{w_E} gRE_{i,v'}}$$

where $gBB_{i,v}$, $gEE_{i,v'}$, $gRR_{i,v''}$, $gBE_{i,v'}$, $gBR_{i,v''}$, $gEB_{i,v}$, $gER_{i,v''}$, $gRB_{i,v}$ and are weighting factors determining to which degree the quality factors contribute in obtaining average quality factors.

11. A target detector as claimed in claim 10, characterised in that the signal processing unit is suitable for determination of $\Delta B$, $\Delta E$, $\Delta R$ in accordance with $$\Delta B = \sum_{i=1}^{n} \Delta B_i \, \overline{Q}_{Bi} / \sum_{i=1}^{n} \overline{Q}_{Bi},$$

$$\Delta E = \sum_{i=1}^{n} \Delta E_i \, \overline{Q}_{Ei} / \sum_{i=1}^{n} \overline{Q}_{Ei},$$

and $$\Delta R = \sum_{i=1}^{n} \Delta R_i \, \overline{Q}_{Ri} / \sum_{i=1}^{n} \overline{Q}_{Ri}.$$

12. A target detector as claimed in claim 9, characterised in that the receiving means are provided with an A/D conversion unit for sampling with frequency $f_s$ and digitising of signals $\Delta B_i$, $\Delta E_i$ and $\Delta R_i$ to obtain digital signals $\Delta B_i^*$, $\Delta E_i^*$ and $\Delta R_i^*$.

13. A target detector as claimed in claim 12, characterised in that the signal processing unit determines that value of h on the basis of the supplied set of quality factors $\overline{Q}_{Bi}$, $\overline{Q}_{Ri}$ ($i=1,2,\ldots n$), for which $\overline{Q}_{Bh} \geq \overline{Q}_{Bi}$ for $i=1,2,\ldots,n$ and $h \in \{1,2,\ldots,n\}$; determines the value of j for which $\overline{Q}_{Ej} \geq \overline{Q}_{Ei}$ for $i=1,2,\ldots,n$ and $j \in \{1,2,\ldots,n\}$; determines the value of k for which $\overline{Q}_{Rk} \geq \overline{Q}_{Ri}$ for $i=1,2,\ldots,n$ and $k \in \{1,2,\ldots,n\}$, where $\Delta B_{i=h}^*$, $\Delta E_{i=j}^*$ and $\Delta R_{i=k}^*$ are continuously selected for generating the target-representing signals and where $p_B$, $p_E$ and $p_R \in \{1,2,\ldots\}$.

14. A target detector as claimed in claim 12, characterised in that the receiving means are provided with an A/D conversion unit for sampling with frequency $f_s$ and digitising of signals $QB_{i,v}$, $QE_{i,v'}$, $QR_{i,v''}$, to obtain digital signals $QB_{i,v}^*$, $QE_{i,v'}^*$.

15. A target detector as claimed in claim 14, characterised in that the signal processing unit is suitable for determining average quality factors $\overline{Q}B_i^*$, $\overline{Q}E_i^*$, $\overline{Q}R_i^*$ in accordance with $$\overline{Q}B_i^* = \frac{\sum_{v=1}^{w_B} QB_{i,v}^* \cdot gBB_{i,v}^* + \sum_{v'=1}^{w_E} QE_{i,v'}^* \cdot gBE_{i,v'}^* + \sum_{v''=1}^{w_R} QE_{i,v''}^* \cdot gBR_{i,v''}^*}{\sum_{v=1}^{w_B} gBB_{i,v}^* + \sum_{v'=1}^{w_E} gBE_{i,v'}^* + \sum_{v''=1}^{w_R} gBR_{i,v''}^*}$$

$$\overline{Q}E_i^* = \frac{\sum_{v'=1}^{w_E} QE_{i,v'}^* \cdot gEE_{i,v'}^* + \sum_{v=1}^{w_B} QB_{i,v}^* \cdot gEB_{i,v}^* + \sum_{v''=1}^{w_R} QR_{i,v''}^* \cdot gER_{i,v''}^*}{\sum_{v'=1}^{w_E} gEE_{i,v'}^* + \sum_{v=1}^{w_B} gEB_{i,v}^* + \sum_{v''=1}^{w_R} gER_{i,v''}^*}$$

$$\overline{Q}R_i^* = \frac{\sum_{v''=1}^{w_R} QR_{i,v''}^* \cdot gRR_{i,v''}^* + \sum_{v=1}^{w_B} QB_{i,v}^* \cdot gRB_{i,v}^* + \sum_{v'=1}^{w_E} QE_{i,v'}^* \cdot gRE_{i,v'}^*}{\sum_{v''=1}^{w_R} gRR_{i,v''}^* + \sum_{v=1}^{w_B} gRB_{i,v}^* + \sum_{v'=1}^{w_E} gRE_{i,v'}^*}$$

where $gBB_{i,v}^*$, $gEE_{i,v'}^*$, $gRR_{i,v''}^*$, $gBE_{i,v'}^*$, $gBR_{i,v''}^*$, $gEB_{i,v}^*$, $gER_{i,v''}^*$, $gRB_{i,v}^*$ and $gRE_{i,v'}^*$ are weighting factors determining the degree to which the quality factors contribute in obtaining average quality factors.

16. A target detector as claimed in claim 15, characterised in that the signal processing unit on the basis of the successively supplied total quality factors $\overline{Q}_{Bi}^*$, $\overline{Q}_{Ei}^*$ en $\overline{Q}_{Ri}^*$ ($i=1,2,\ldots,n$), determines the value of h were $\overline{Q}_{Bh}^* \geq \overline{Q}_{Bi}^*$ for $i=1,2,\ldots,n$ and $h \in \{1,2,\ldots,n\}$; determines the value of j were $\overline{Q}_{Ej}^* \geq \overline{Q}_{Ei}^*$ for $i=1,2,\ldots,n$ and $j \in \{1,2,\ldots,n\}$; determines the value of k were $\overline{Q}_{Rk}^* \geq \overline{Q}_{Ri}^*$ for $i=1,2,\ldots,n$ and $k \in \{1,2,\ldots,n\}$ and where $\Delta B_{i=h}^*$, $\Delta E_{i=j}^*$ and $\Delta R_{i=k}^*$ are continuously selected for generating the target-representing signals and where $p_B$, $p_E$ and $p_R \in \{1,2,\ldots\}$.

17. A target detector as claimed in claim 14, characterised in that $w_B = w_E = w_R = 6$, where the quality factors $QB_{i,v}^*$, $QE_{i,v'}^*$, $QR_{i,v''}^*$ with $v = v' = v'' = 1$ relate to the degree of jamming on frequency $f_i$; the quality factors $QB_{i,v}^*$, $QE_{i,v'}^*$, $QR_{i,v''}^*$ with $v, v', v'' = 2$ or 3 relate to the magnitude of the signal-to-noise ratio of the received signals with frequency $f_i$; and where the quality factors $QB_{i,v}^*$, $QE_{i,v'}^*$, $QR_{i,v''}^*$ with $v, v', v'' = 4$ or 5 relate to the amount of clutter present in the received signals with frequency $f_i$.

18. A target detector as claim in claim 14, characterised in that the quality factors assume the values 0 or 1, indicating whether a certain quality threshold has been passed or whether another quality criterion has been satisfied.

19. A target detector as claimed in claim 17, characterised in that the quality factors $QB_{i,v}^*$, $QE_{i,v'}^*$, $QR_{i,v''}^*$ with $v=v'=v''=1$ assume the value 1 if jamming is present in the received signals having frequency $f_i$ and assume the value 0 in all other cases; the quality factors $QB_{i,v}^*$, $QE_{i,v'}^*$, $QR_{i,v''}^*$ with $v=v'=v''=2$ assume the value 1 if the signal-to-noise ratios are better than a first set of three threshold values and assume the value 0 in all other cases;

the quality factors $QB_{i,v}^*$, $QE_{i,v'}^*$, $QR_{i,v''}^*$ with $v=v'=v''=3$ assume the value 1 if the signal-to-noise ratios are better than a second set of three threshold values and assume the value 0 in all other cases;

the quality factors $QB_{i,v}^*$, $QE_{i,v'}^*$, $QR_{i,v''}^*$ with $v=v'=v''=4$ assume the value 1 if the clutter amounts exceed a third set of three threshold values and assume the value 0 in all other cases, and where the quality factors $QB_{i,v}^*$, $QE_{i,v'}^*$, $QR_{i,v''}^*$ with $v=v'=v''=5$ assume the value 1 if the clutter amounts exceed a fourth set of three threshold values and assume the value 0 in all, other cases.

20. A target detector as claimed in claim 17 or 18, characterised in that $f_1$ concerns a first radar frequency suitable for tracking targets at relatively short ranges and $f_2$ concerns a second radar frequency different from the first suitable for tracking of targets at relatively long ranges and where the quality factor $QR_{i,v''}^*$ with $v''=6$ and $i=1$, assumes the value 1 if the target range detected at frequency $f_1$ is smaller than the target range detected at frequency $f_2$ and quality factor $QR_{i,v''}^*$ with $v''=6$ and $i=2$, assumes the value 1 if the target range detected at frequency $f_2$ is smaller than the target range detected at frequency $f_1$.

21. A target detector as claimed in claim 17 or 18, characterised in that the signal processing unit continuously selected signals $\Delta B_{i=h}^*$, $\Delta E_{i=j}^*$ and $\Delta R_{i=k}^*$ where on the basis of the supplied set of quality factors $QB_{i,v}^*$, $QE_{i,v'}$, *, $QR_{i,v''}^*$ ($i=1,2,\ldots,n; v=1,2,\ldots,V_B$; $v'=1,2,\ldots,w_E$; $v''=1,2,\ldots w_R$) the value of h is continuously determined according to a logical function $f_B$ with as arguments the said quality factors, the value of j is continuously determined according to a logical function $f_E$ with as arguments the said quality factors, and the value of k is continuously determined according to a logical function $f_R$ with as arguments the said quality factors.

22. A target detector as claimed in claim 8, characterised in that the signal processing unit comprises at least a feed-back circuit for adjusting the said threshold values as a function of the values of the quality factors.

23. A target detector as claimed in claim 12, characterised in that the signal processing unit is provided with a D/A converter for generating a first component $\Delta B$ of the target-representing signal from the successive signals $\Delta B_{i=h}^*$ and for generating a second component $\Delta E$ of the target-representing signal from the successive signals $\Delta E_{i=j}^*$ and for generating a third component $\Delta R$ of the target-representing signal from the successive signals $\Delta R_{i=k}^*$.

24. A target detector as claimed in claim 12, characterised in that the receiving means are suitable for supplying the sampled and digitised signals $\Delta B_i^*$, $\Delta E_i^*$ and $\Delta R_i^*$ to the signal processing unit on a time-sharing basis.

25. A target detector as claimed in claim 14, characterised in that the receiving means are suitable for supplying the sampled and digitised quality factors to the signal processing unit on a time-sharing basis.

26. A target detector as claimed in claim 9, characterised in that $\Delta R$ is suitable for adjusting a range gate of the receiving means.

27. A target detector as claimed in claim 1, for, characterised in that the emission and detection device is directable and where the target-representing signals are suitable for aiming the emission and detection device at the target.

28. A target detector as claimed in claim 1, characterised in that the target detector is suitable for searching targets where it is provided with a rotatable emission and detection device.

29. A target detector as claimed in claim 28, characterised in that the target detector is provided with a track generator for generating a track by means of the target-representing signals.

30. A target detector as claimed in claim 1, characterised in that the target-representing signals are suitable for controlling a fire-control computer.

31. A target detector as claimed in claim 4, characterised in that $m=2$, where $f_1$ is a frequency which is relatively much higher than $f_2$ and where $f_1$ is suitable for detecting the target at a relatively long distance from the target detector and $f_2$ is suitable for detecting the target at a relatively short distance from the target detector.

* * * * *